United States Patent
Choi

(10) Patent No.: US 11,418,803 B2
(45) Date of Patent: Aug. 16, 2022

(54) INTRA-PREDICTION-BASED IMAGE CODING METHOD AND DEVICE THEREFOR

(71) Applicant: LG Electronics Inc., Seoul (KR)

(72) Inventor: Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/044,545

(22) PCT Filed: Apr. 1, 2019

(86) PCT No.: PCT/KR2019/003806
§ 371 (c)(1),
(2) Date: Oct. 1, 2020

(87) PCT Pub. No.: WO2019/194500
PCT Pub. Date: Oct. 10, 2019

(65) Prior Publication Data
US 2021/0112263 A1   Apr. 15, 2021

Related U.S. Application Data

(60) Provisional application No. 62/651,254, filed on Apr. 1, 2018.

(51) Int. Cl.
*H04N 19/00*   (2014.01)
*H04N 19/44*   (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/132; H04N 19/44; H04N 19/105; H04N 19/593; H04N 19/159;
(Continued)

(56) References Cited

U.S. PATENT DOCUMENTS

2017/0272748 A1* 9/2017 Seregin ................. H04N 19/11
2017/0366818 A1* 12/2017 Zhang ................... H04N 19/70
2018/0077426 A1* 3/2018 Zhang ................... H04N 19/46

FOREIGN PATENT DOCUMENTS

| KR | 20150064406 | 6/2015 |
| KR | 101601840 | 3/2016 |
| KR | 101756843 | 7/2017 |

\* cited by examiner

*Primary Examiner* — Zhihan Zhou
(74) *Attorney, Agent, or Firm* — Fish & Richardson P.C.

(57) ABSTRACT

A picture decoding method performed by a decoding apparatus according to the present disclosure includes detecting intra prediction modes of a plurality of luma blocks in a luma region corresponding to a current chroma block, generating a first predicted block for the current chroma block based on a first intra prediction mode of the intra prediction modes of the plurality of luma blocks, generating a second predicted block for the current chroma block based on a second intra prediction mode of the intra prediction modes of the plurality of luma blocks, generating a predicted block for the current chroma block based on a weighted sum using the first predicted block and the second predicted block, and generating a reconstructed block based on the predicted block for the current chroma block.

5 Claims, 8 Drawing Sheets

(51) Int. Cl.
*H04N 19/105* (2014.01)
*H04N 19/132* (2014.01)
*H04N 19/159* (2014.01)
*H04N 19/176* (2014.01)
*H04N 19/186* (2014.01)

(52) U.S. Cl.
CPC ......... *H04N 19/159* (2014.11); *H04N 19/176* (2014.11); *H04N 19/186* (2014.11)

(58) Field of Classification Search
CPC .... H04N 19/186; H04N 19/176; H04N 19/70; H04N 19/11
See application file for complete search history.

FIG. 5

INTRA-PREDICTION-BASED IMAGE CODING METHOD AND DEVICE THEREFOR

CROSS-REFERENCE TO RELATED APPLICATIONS

This application is a National Stage application under 35 U.S.C. § 371 of International Application No. PCT/KR2019/003806, filed on Apr. 1, 2019, which claims the benefit of U.S. Provisional Application No. 62/651,254 filed on Apr. 1, 2018. The disclosures of the prior applications are incorporated by reference in their entirety.

BACKGROUND OF THE DISCLOSURE

Field of the Disclosure

The present disclosure relates generally to an image coding technology and, more particularly, to an image coding method based on intra prediction and an apparatus therefor.

Related Art

Demands for high-resolution and high-quality images, such as HD (High Definition) images and UHD (Ultra High Definition) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

A technical objective of the present disclosure is to provide a method and apparatus which increase image coding efficiency.

Another technical objective of the present disclosure is to provide a method and apparatus which increase intra prediction efficiency.

Still another technical objective of the present disclosure is to provide a method and apparatus which increase intra prediction efficiency based on chroma prediction mode candidates.

Still another technical objective of the present disclosure is to provide a method and apparatus which increase intra prediction efficiency based on at least one of neighboring samples of a chroma block and samples in a luma block corresponding to the chroma block when a cross component linear model (CCLM) is not applied.

Still another technical objective of the present disclosure is to provide a method and apparatus which derive a new chroma intra prediction mode based on chroma prediction mode candidates.

According to an example of the present disclosure, there is provided a picture decoding method which is performed by a decoding apparatus. The method includes detecting intra prediction modes of a plurality of luma blocks in a luma region corresponding to a current chroma block, generating a first predicted block for the current chroma block based on a first intra prediction mode of the intra prediction modes of the plurality of luma blocks, generating a second predicted block for the current chroma block based on a second intra prediction mode of the intra prediction modes of the plurality of luma blocks, generating a predicted block for the current chroma block based on a weighted sum using the first predicted block and the second predicted block, and generating a reconstructed block based on the predicted block for the current chroma block.

According to another example of the present disclosure, there is provided a decoding apparatus performing picture decoding. The decoding apparatus includes a predictor detecting intra prediction modes of a plurality of luma blocks in a luma region corresponding to a current chroma block, generating a first predicted block for the current chroma block based on a first intra prediction mode of the intra prediction modes of the plurality of luma blocks, generating a second predicted block for the current chroma block based on a second intra prediction mode of the intra prediction modes of the plurality of luma blocks, and generating a predicted block for the current chroma block based on a weighted sum using the first predicted block and the second predicted block; and an adder generating a reconstructed block based on the predicted block for the current chroma block.

According to the present disclosure, it is possible to increase overall image/video compression efficiency.

According to the present disclosure, it is possible to increase the intra prediction efficiency.

According to the present disclosure, it is possible to increase the image coding efficiency by preforming intra prediction based on the derived chroma prediction mode candidates.

According to the present disclosure, it is possible to increase the image coding efficiency by preforming intra prediction based on the chroma prediction mode candidates when the CCLM is not applied.

According to the present disclosure, it is possible to increase the intra prediction accuracy of a chroma image by providing a method of combining or connecting chroma intra prediction mode candidates.

According to the present disclosure, it is possible to increase the intra encoding and decoding efficiency of a chroma image by providing a method of combining or connecting chroma intra prediction mode candidates.

BRIEF DESCRIPTION OF THE DRAWINGS

FIG. 5 is a diagram for describing a process of deriving an intra prediction mode of a current chroma block based on a weighted sum according to an embodiment.

DESCRIPTION OF EXEMPLARY EMBODIMENTS

Figure 1:
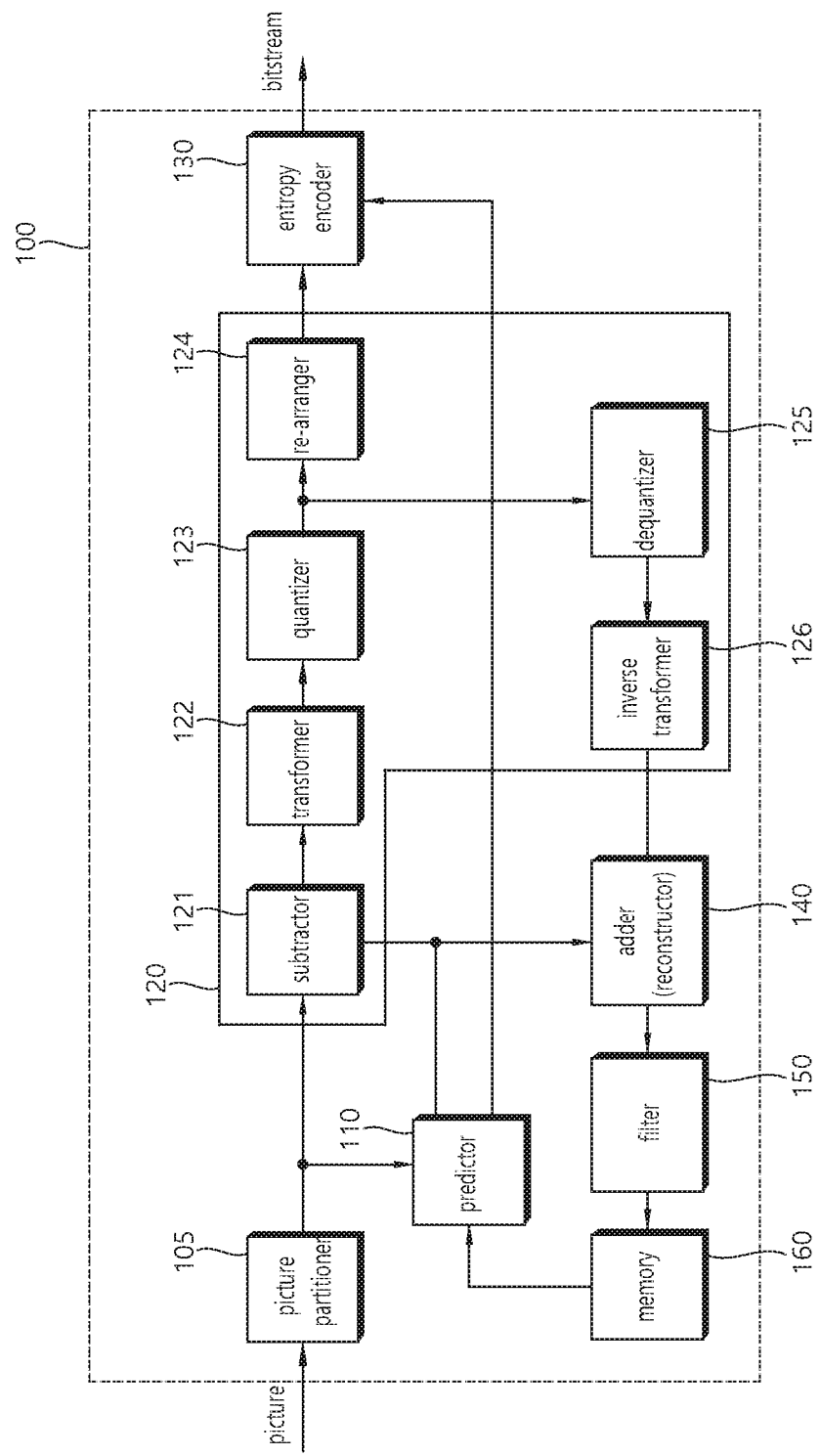
FIG. 1 is a diagram schematically illustrating a configuration of an encoding apparatus according to an embodiment.

According to an embodiment of the present disclosure, a picture decoding method performed by a decoding apparatus. The method includes detecting intra prediction modes of a plurality of luma blocks in a luma region corresponding to a current chroma block; generating a first predicted block for the current chroma block based on a first intra prediction mode of the intra prediction modes of the plurality of luma blocks; generating a second predicted block for the current chroma block based on a second intra prediction mode of the intra prediction modes of the plurality of luma blocks; generating a predicted block for the current chroma block based on a weighted sum using the first predicted block and the second predicted block; and generating a reconstructed block based on the predicted block for the current chroma block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 briefly illustrates a structure of an encoding apparatus to which the present disclosure is applicable. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
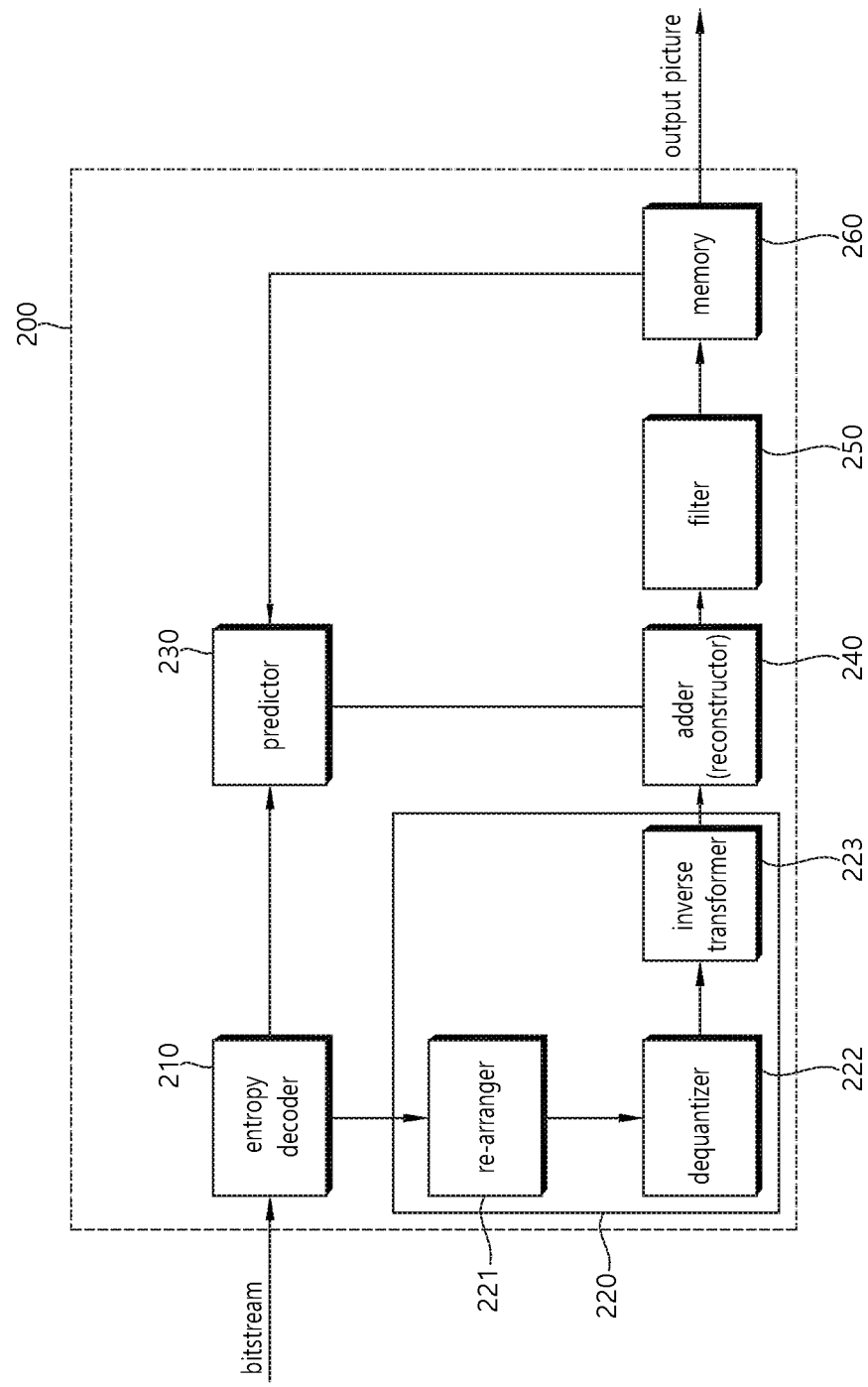
FIG. 2 is a diagram schematically illustrating a configuration of a decoding apparatus according to an embodiment.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223. Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternery tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firtly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
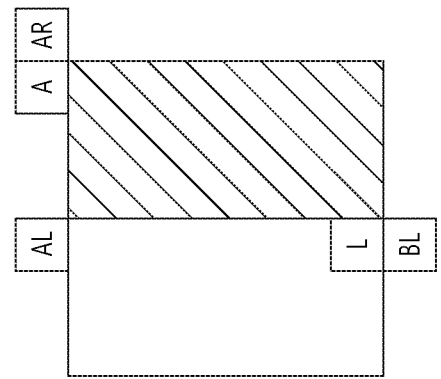
FIG. 3 is a diagram for describing a process of deriving an intra prediction mode of a current chroma block according to an embodiment.
Figure 3:
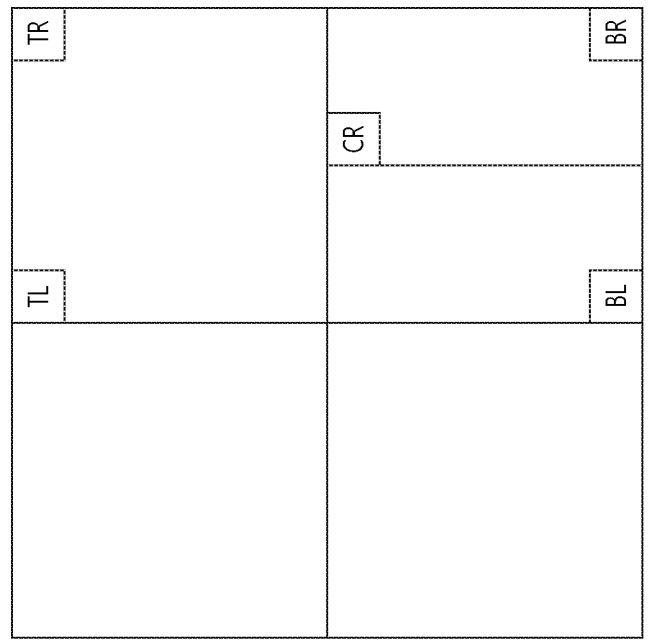

FIG. 3 is a diagram for describing a process of deriving an intra prediction mode of a current chroma block according to an embodiment.

In the present specification, "chroma block," "chroma image" and the like may represent the same meanings as a chrominance (or color difference) block, a chrominance image and the like, and thus the terms chroma and chrominance may be used interchangeably. Similarly, "luma block," "luma image" and the like may represent the same meanings as a luminance block, a luminance image, and the like, and thus the terms luma and luminance may be used interchangeably.

In one embodiment, when performing intra encoding of a chrominance image in a Joint Exploration TEST Model (JEM) used in a Joint Video Exploration Team (JVET), prediction may be performed in a cross component linear model (CCLM) mode or a non-CCLM mode according to the classification. FIG. 3 may be used to describe an example of selecting a prediction mode candidate in the non-CCLM mode.

In the present specification, the "luma region" may mean a region corresponding to a current chroma block for performing intra prediction. The luma region may include at least one luma block.

In FIG. 3, the luma region is a right region from the center of the rectangle shown on the left. In FIG. 3, a top-left sample position of the luma region is expressed as TL, a top-right sample position is expressed as TR, a center bottom-right sample position is expressed as CR, a bottom-left sample position is expressed as BL, and a bottom-right sample position is expressed as BR.

In FIG. 3, the current chroma block is a right region from the center of the rectangle shown on the right. In FIG. 3, a bottom-left corner neighboring chroma block of the current chroma block is expressed as BL, a bottom-left neighboring chroma block is expressed as L, a top-right corner neighboring chroma block is expressed as AR, a bottom-right neighboring chroma block is expressed as A, and a top-left corner neighboring chroma block is expressed as AL.

The non-CCLM mode may include DC, planar and directional modes, and five prediction modes may be determined in the order of selection through the following order without redundancy.

First, in the order of CR, TL, TR, BL, and BR positions of the same position luminance block in a direct mode (DM), an intra prediction mode corresponding to each position may be selected as an intra prediction mode of a chrominance image.

Second, in the order of L, A, BL, AR, and AL blocks, which are current chrominance block neighboring blocks, the corresponding intra prediction mode may be selected as the intra prediction mode of the chrominance image.

Third, the planar mode or the DC mode may be selected as the intra prediction mode of the chrominance image.

Fourth, −1 or +1 angular mode of the previously selected angular mode may be selected as the intra prediction mode of the chrominance image.

Fifth, vertical, horizontal, 2nd, 34th, 66th, 10th, and 26th modes may be selected as intra prediction modes of the chrominance image.

Sixth, when the five prediction modes described above from the first to the fifth are not selected, previously selected modes may be copied and selected.

The prediction modes selected under the non-CCLM may be encoded through the binarization thereof, and the mode selected through the encoding in the encoder may be transmitted to the decoder through context modeling. Examples of indexes and binarized bits for the chroma prediction mode candidates are shown in Table 1 below.

TABLE 1

| Mode index | binarization |
| --- | --- |
| 0 | 0 |
| 1 | 10 |
| 2 | 110 |
| 3 | 1110 |
| 4 | 11110 |

The intra prediction mode according to an embodiment may be classified as shown in Table 2 below.

TABLE 2

| Intra prediction mode | Associated name |
| --- | --- |
| 0 | Intra planar (INTRA_PLANAR) |
| 1 | DC (INTRA_DC_ |
| 2 . . . 66 | Intra directionality 2 . . . Intra directionality 66 (INTRA_ANGULAR2 . . . INTRA_ANGULAR66) |

In Table 2, the horizontal mode may indicate intra directionality 18, that is, the 18th intra prediction mode, and the vertical mode may indicate intra directionality 50, that is, the 50th intra prediction mode.

Figure 4:
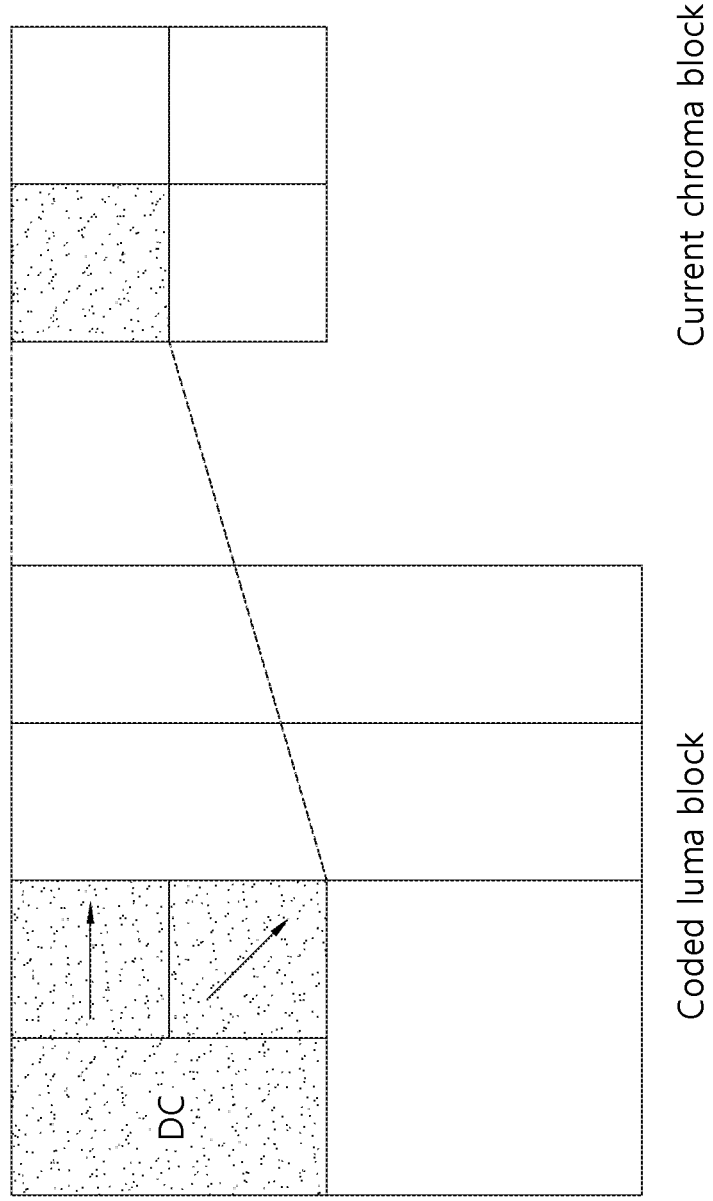
FIG. 4 is a diagram for describing a process of deriving an intra prediction mode of a current chroma block according to another embodiment.

FIG. 4 is a diagram for describing a process of deriving an intra prediction mode of a current chroma block according to another embodiment.

The present specification proposes a method of performing chrominance block intra prediction through a combination of selected prediction candidate modes when predicting the DM mode of a chrominance image. As described above in FIG. 3, when selecting the intra prediction mode candidates of a chrominance image, the intra prediction mode of a luminance block corresponding to the same position of the current chrominance block may be selected (this may be classified as, for example, a DM mode). In an example, when there is a luminance block corresponding to the current chrominance block as shown in FIG. 4, the intra prediction mode candidate of a chrominance image may be determined in the order of DIAGONAL, DC, and HORIZONTAL modes through the DM mode.

However, if the structures of the current chrominance block and the corresponding luminance block are not equal to each other as in the example of FIG. 4, there may occur a problem in that the chrominance block prediction accuracy of the intra prediction mode candidates determined through the DM mode is deteriorated.

Figure 5:
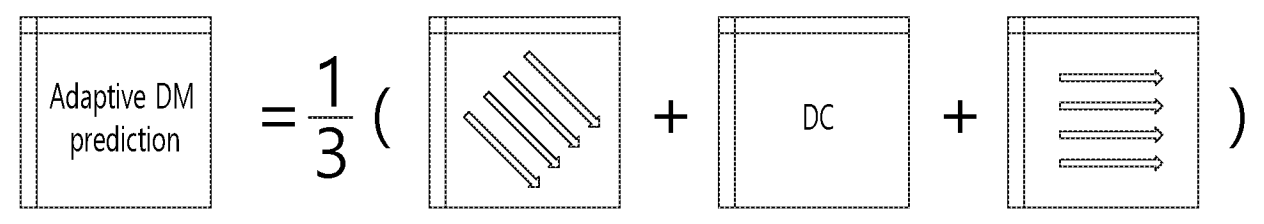

FIG. 5 is a diagram for describing a process of deriving an intra prediction mode of a current chroma block based on a weighted sum according to an embodiment.

The present specification proposes a method of increasing the chrominance block prediction accuracy through a combination of intra prediction candidates determined in the DM mode (this may be referred to as "combined DM mode" or "adaptive DM mode"). When there are a plurality of intra prediction mode candidates determined through the DM mode, prediction of the current chrominance block is performed through each mode, and then the predicted images are combined with each other and used for the encoding. FIG. 5 shows an example of performing adaptive DM prediction proposed by using DIAGONAL, DC, and HORIZONTAL modes selected through the DM prediction of a current chrominance block as shown in FIG. 4. That is, the three predictions selected through the DM prediction may be each applied to a current chrominance block to generate prediction images, which may be then combined to generate a new prediction image. The weight of each prediction image pixel used for the image combination is determined as the reciprocal of the number of DM prediction modes to be combined. If there is one color intra prediction mode candidate selected through the DM mode, the method proposed in this specification is not used.

A method of selecting a non-CCLM intra prediction mode including the adaptive DM mode proposed in the present specification is as follows.

First, a combined DM mode may be selected.

Second, intra prediction mode of CR, TL, TR, BL, and BR positions of the same position luminance block may be selected in the direct mode (DM) mode.

Third, intra prediction mode of L, A, BL, AR, and AL blocks, which are current color block neighboring blocks, may be selected.

Fourth, the PLANAR and DC modes may be selected.

Fifth, −1 or +1 angular mode may be selected to the previously selected angular mode.

Sixth, vertical, horizontal, 2nd, 34th, 66th, 10th and 26th modes

Seventh, when the five prediction modes are not selected, the previously selected mode may be copied and selected.

In another embodiment, a DM mode other than the adaptive DM mode with improved prediction accuracy may be excluded as shown in the following example.

First, a combined DM mode may be selected.

Second, intra prediction modes of L, A, BL, AR, and AL blocks, which are current color block neighboring blocks, may be selected.

Third, the PLANAR and DC modes may be selected.

Fourth, −1 or +1 angular mode may be selected to the previously selected angular mode.

Fifth, vertical, horizontal, 2nd, 34th, 66th, 10th and 26th modes may be selected.

Sixth, when the five prediction modes are not selected, the previously selected mode may be copied and selected.

The selected mode and binarization method may be shown in Table 1 above, or, a binarization bit weight may be assigned to the combined DM mode as shown in Table 3 below.

TABLE 3

| Mode index | binarization |
|---|---|
| 0 | 0 |
| 1 | 100 |
| 2 | 101 |
| 3 | 110 |
| 4 | 111 |

The predicted color block may be used for image reconstruction in an encoder through combination with a transmitted residual signal.

Figure 6:
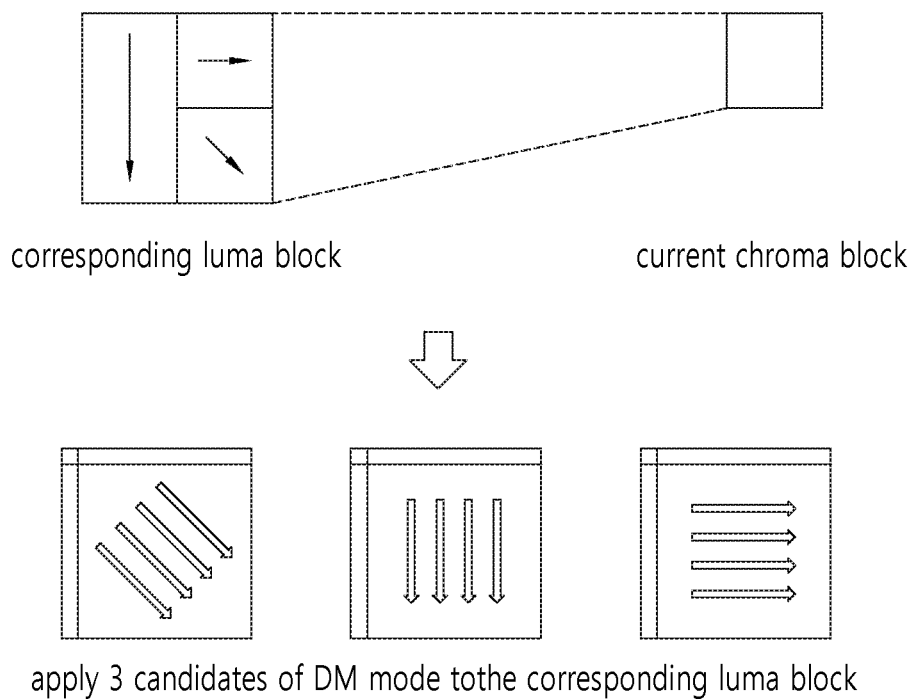
FIG. 6 is a diagram for describing a process of deriving an intra prediction mode of a current chroma block based on a weighted sum according to another embodiment.

FIG. 6 is a diagram for describing a process of deriving an intra prediction mode of a current chroma block based on a weighted sum according to another embodiment.

FIG. 6 discloses a method of adaptively selecting the number of DM modes to be combined in the process of generating the combined DM mode. When the number of intra prediction modes selected through the DM mode is large, there occurs a problem in that the intra prediction accuracy may be lowered when all of them are combined. Therefore, only two or maximum three of DM mode candidates may be used to generate the combined DM mode.

In one embodiment, a limited number of DM modes are determined to select DM mode candidates for combination in the order of selection. For example, intra prediction mode at CR, TL, TR, BL, and BR positions of the same position luminance block may be selected.

In another embodiment, after selecting all DM mode candidates, they may be sorted in the order of prediction accuracy, and then the limited number of DM modes may be selected and combined. In order to determine the prediction accuracy, the selected DM mode prediction may be applied to the luminance block corresponding to the current color block. That is, as illustrated in FIG. 6, after applying intra prediction modes corresponding to the DM mode of the current color block to the luminance block, prediction accuracy is determined using an error value between the reconstructed luminance image and the predicted luminance image. For this, a sum squared error (SSE), a sum of absolute difference (SAD), or a sum of absolute transformed differences (SATD) between the reconstructed luminance image and the predicted luminance image may be used.

In another embodiment, when selecting the DM mode candidates for the combination, they may be sorted in the order of prediction accuracy for all intra prediction directions existing in the luminance block corresponding to the current chroma block, and then a limited number of DM modes may be selected and combined.

When generating a combined DM mode according to an embodiment, a weight may be assigned according to the importance of the DM mode to be combined. More specifically, a higher weight may be given to a DM mode candidate selected preferentially over other DM mode candidates. In an example, when the DIAGONAL mode, the DC mode, and the horizontal mode are selected in this order, the weight of the preferentially selected DIAGONAL mode may correspond to twice the weight of other DM mode candidates. Normalization may be performed according to the changed weight.

Alternatively, in the luminance block corresponding to the current chroma block, a weight may be set in proportion to a block area including each DM mode. In one example, when the current chroma block and the corresponding luminance block exist as shown in FIG. 4, since the DC mode block is twice larger than the DIAGONAL and HORIZONTAL mode blocks, the combined DM mode may be generated by giving twice the weight to the DC mode, and normalization may be performed according to the changed weight.

Figure 7:
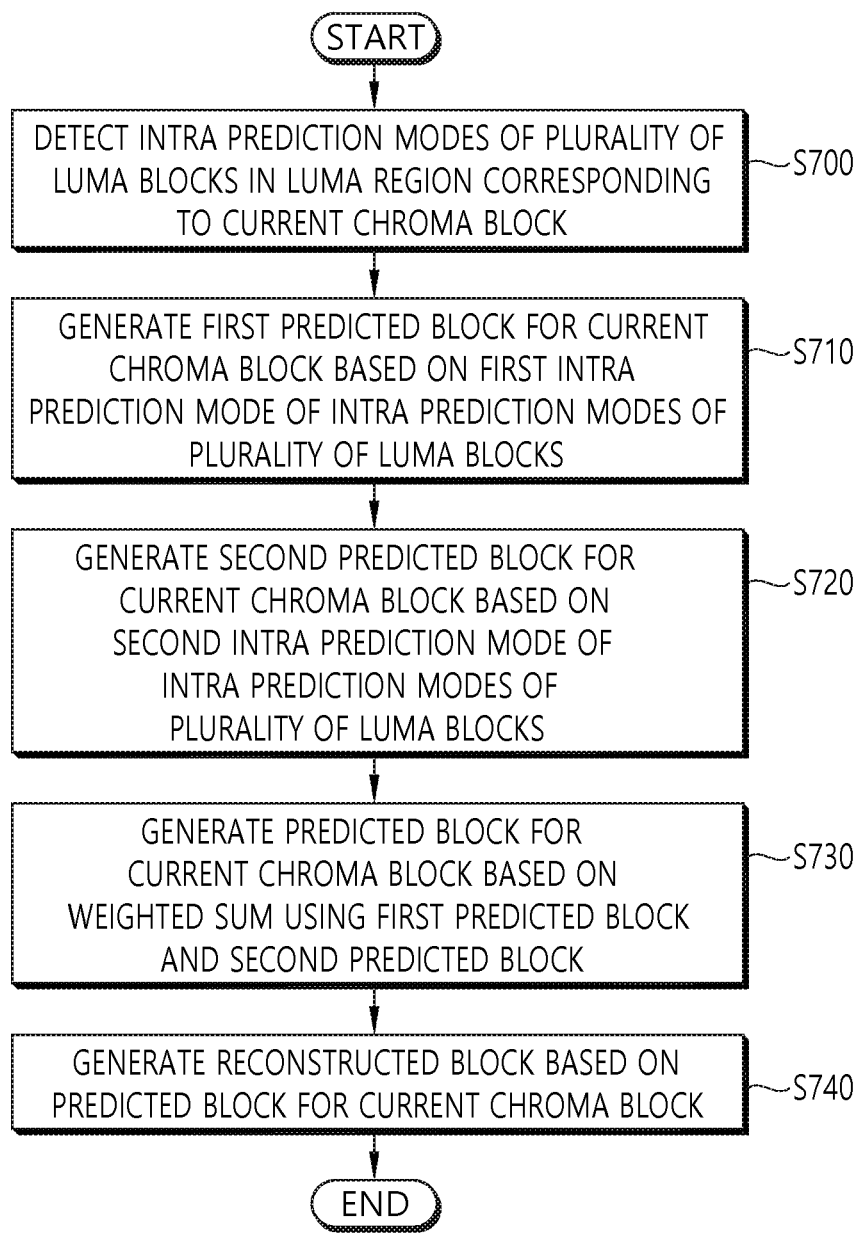
FIG. 7 is a flowchart showing an operation method of a decoding apparatus according to an embodiment.
Figure 8:
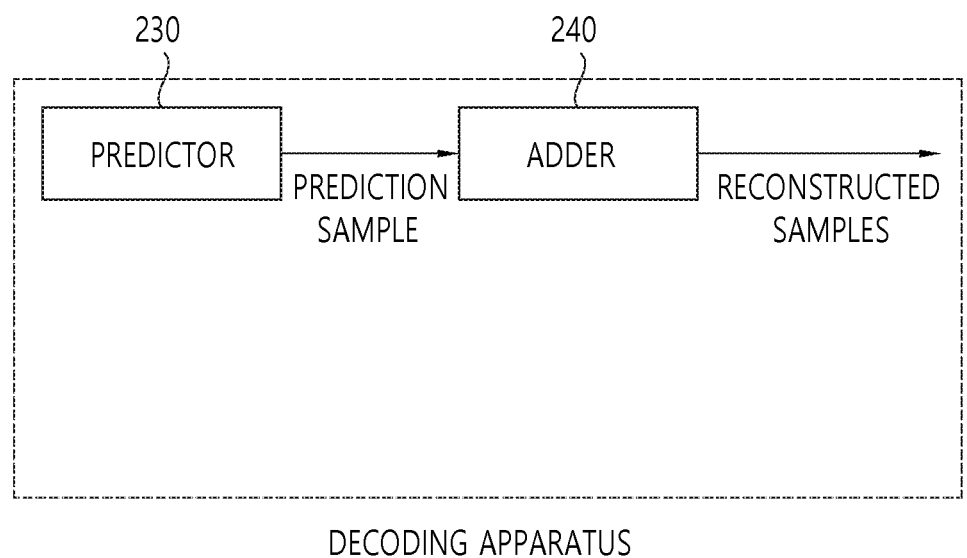
FIG. 8 is a block diagram showing a configuration of a decoding apparatus according to an embodiment.

FIG. 7 is a flowchart showing an operation method of a decoding apparatus according to an embodiment, and FIG. 8 is a block diagram showing a configuration of a decoding apparatus according to an embodiment.

Each of steps disclosed in FIG. 7 may be performed by the decoding apparatus 200 disclosed in FIG. 2. More specifically, S700 to S730 may be performed by the predictor 230 disclosed in FIG. 2, S740 may be performed by the adder 240 disclosed in FIG. 2, and S740 may be performed by the adder 240 disclosed in FIG. 2. Further, operations according to S700 to S740 are based on some of contents described above in FIGS. 3 to 6. Therefore, an explanation for the specific content duplicated with contents described above in FIGS. 2 to 6 will be omitted or made briefly.

As shown in FIG. 8, the decoding apparatus according to an embodiment may include the predictor 230 and the adder 240. However, in some cases, all of the components shown in FIG. 8 may not be essential components of the decoding apparatus, and the decoding apparatus may be implemented by more or less components than those shown in FIG. 8.

In the decoding apparatus according to an embodiment, the predictor 230 and the adder 240 may be implemented by separate chips, or at least two or more components may be implemented by a single chip.

The decoding apparatus according to an embodiment may detect intra prediction modes of a plurality of luma blocks in a luma region corresponding to a current chroma block (S700).

The decoding device according to an embodiment may generate a first predicted block for the current chroma block based on a first intra prediction mode of the intra prediction modes of the plurality of luma blocks (S710).

The decoding device according to an embodiment may generate a second predicted block for the current chroma block based on a second intra prediction mode of the intra prediction modes of the plurality of luma blocks (S720).

The decoding device according to an embodiment may generate a predicted block for the current chroma block based on a weighted sum using the first predicted block and the second predicted block (S730).

The decoding device according to an embodiment may generate a reconstructed block based on the predicted block for the current chroma block (S740).

The decoding device according to an embodiment may determine chroma prediction mode candidates based on the intra prediction modes of the plurality of luma blocks, intra prediction modes of neighboring chroma blocks of the current chroma block, and at least one default prediction mode. In this case, at least one default prediction mode may include the planar mode and the DC mode.

In an embodiment, the chroma prediction mode candidates may include a first intra prediction mode used to generate the predicted block for the current chroma block, and when the first intra prediction mode is selected from among the chroma prediction mode candidates, the predicted block for the current chroma block may be generated based on the weighted sum using the first predicted block and the second predicted block.

In an embodiment, when the first intra prediction mode is the DC mode, the decoding apparatus may derive first prediction samples in the first predicted block by using a DC value derived based on values of left neighboring samples and top neighboring samples of the current chroma block; when the second intra prediction mode is the horizontal mode, the decoding apparatus may derive second prediction samples in the second predicted block based on left samples of the current chroma block, and may derive prediction samples of the predicted block based on the weighted sum using the first prediction samples and the prediction samples.

The decoding apparatus according to an embodiment may receive index information on an intra chroma prediction mode, wherein when the value of the index information indicates 0, the first intra prediction mode may be selected from among the chroma prediction mode candidates.

In an embodiment, the chroma prediction mode candidates may include the first intra prediction mode, a second intra prediction mode, a third intra prediction mode, a fourth intra prediction mode, and a fifth intra prediction mode; the value of the index information may be derived based on binarization bits for the index information; when the value of the binarization bits is 0, the first intra prediction mode may be selected from among the chroma prediction mode candidates; when the value of the binarization bits is 100, the second intra prediction mode may be selected from among the chroma prediction mode candidates; when the value of the binarization bits is 101, the third intra prediction mode may be selected from among the chroma prediction mode candidates; when the value of the binarization bits is 110, the fourth intra prediction mode may be selected from among the chroma prediction mode candidates; and when the value of the binarization bits is 111, the fifth intra prediction mode may be selected from among the chroma prediction mode candidates.

In an embodiment, a first weight and second weight for the first predicted block and second predicted block used to derive the weighted sum may be equal to each other.

In an embodiment, the total number of the chroma prediction mode candidates may be limited to a predefined threshold value. The predefined threshold may be, for example, 2, 3, 4, 5, 6, or the like.

When detecting of the intra prediction modes of the plurality of luma blocks, the decoding apparatus according to an embodiment may generate a plurality of luma prediction blocks based on each of the intra prediction modes of the luma blocks, perform prediction accuracy determination for each of the plurality of luma prediction blocks based on a reconstructed block for the luma block, and detect at least one selected luma block from among the plurality of luma blocks based on the prediction accuracy determination.

When detecting intra prediction modes of a plurality of luma blocks, the decoding apparatus according to an embodiment may detect intra prediction modes of the plurality of luma blocks based on at least one of a first luma block covering a center bottom-right sample position of the luma region, a second luma block covering a top-left sample position of the luma region, a third luma block covering a top-right sample position of the luma region, a fourth luma block covering a bottom-left sample position of the luma region, and a fifth luma block covering a bottom-right sample position of the luma region.

In an embodiment, weights used to derive the weighted sum may be each determined based on order in which the intra prediction modes of the plurality of luma blocks are detected.

In an embodiment, among the weights, a weight corresponding to the intra prediction mode detected first among the intra prediction modes of the plurality of luma blocks may be twice other weights.

In an embodiment, weights used to derive the weighted sum may be determined in proportion to the size of each of the plurality of luma blocks.

According to the decoding apparatus and the operation method of the decoding apparatus of FIGS. 7 and 8, intra prediction modes of the plurality of luma blocks in the luma region corresponding to the current chroma block may be detected (S700), the first predicted block for the current chroma block may be generated based on the first intra prediction mode of the intra prediction modes of the plurality of luma blocks (S710), the second predicted block for the current chroma block may be generated based on the second intra prediction mode of the intra prediction modes of the plurality of luma blocks (S720), the predicted block for the current chroma block may be generated based on the weighted sum using the first predicted block and the second predicted block (S730), the reconstructed block may be generated based on the predicted block for the current chroma block (S740). That is, by providing a method of combining or connecting chroma intra prediction mode candidates, the intra-picture encoding and decoding efficiency of a chroma image may be improved.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device.

What is claimed is:

1. A picture decoding method performed by a decoding apparatus, the method comprising:
    detecting intra prediction modes of a plurality of luma blocks in a luma region corresponding to a current chroma block;
    deriving chroma prediction mode candidates for the current chroma block, wherein the chroma prediction mode candidates include a combined direct mode, a first intra prediction mode of the intra prediction modes of the plurality of the luma blocks, a second intra prediction mode of the intra prediction modes of the plurality of the luma blocks, intra prediction modes of neighboring chroma blocks of the current chroma block, and at least one of default prediction modes;
    receiving index information regarding an intra chroma prediction mode;
    selecting the intra chroma prediction mode of the current chroma block based on the chroma prediction mode candidates and the index information regarding the intra chroma prediction mode;
    generating a predicted block for the current chroma block based on the selected intra chroma prediction mode of the current chroma block; and
    generating a reconstructed block based on the predicted block for the current chroma block,
    wherein the default prediction modes include at least one of a DC mode or a planar mode,
    wherein, based on a value of the index information being 0, the combined direct mode is selected from among the chroma prediction mode candidates,
    wherein a maximum number of the chroma prediction mode candidates is 5, and the value of the index information is one among 0 through 4,
    wherein the value of the index information is derived based on binarization bits for the index information,
    wherein for the value of the index information being 0, the binarization bits is represented by 0,
    wherein for the value of the index information being 1, the binarization bits is represented by 100,
    wherein for the value of the index information being 2, the binarization bits is represented by 101,
    wherein for the value of the index information being 3, the binarization bits is represented by 110,
    wherein for the value of the index information being 4, the binarization bits is represented by 111, and
    wherein generating the predicted block for the current block comprises:
        generating a first predicted block for the current chroma block based on the first intra prediction mode of the intra prediction modes of the plurality of the luma blocks, wherein the first predicted block includes first predicted pixels for the current chroma block,
        generating a second predicted block for the current chroma block based on the second intra prediction mode of the intra prediction modes of the plurality of the luma blocks, wherein the second predicted block includes second predicted pixels for the current chroma block, and
        generating the predicted block for the current chroma block based on a weighted sum using the first predicted block and the second predicted block, and
    wherein a predicted pixel of the predicted block for the current chroma block is generated based on the weighted sum using a first predicted pixel of the chroma block and a second predicted pixel of the chroma block.

2. The picture decoding method of claim 1, wherein a first weight and a second weight for the first predicted block and the second predicted block used to derive the weighted sum are equal to each other.

3. The picture decoding method of claim 1, wherein the detecting of the intra prediction modes of the plurality of the luma blocks includes:
    detecting the intra prediction modes of the plurality of the luma blocks based on at least one of a first luma block covering a center bottom-right sample position of the luma region, a second luma block covering a top-left sample position of the luma region, a third luma block covering a top-right sample position of the luma region, a fourth luma block covering a bottom-left sample position of the luma region, or a fifth luma block covering a bottom-right sample position of the luma region.

4. A decoding apparatus which performs picture decoding, the decoding apparatus comprising:
    an entropy decoder configured to receive index information regarding an intra chroma prediction mode;
    a predictor configured to:
        detect intra prediction modes of a plurality of luma blocks in a luma region corresponding to a current chroma block,
        derive chroma prediction mode candidates for the current chroma block, wherein the chroma prediction mode candidates include a combined direct mode, a first intra prediction mode of the intra prediction modes of the plurality of the luma blocks, a second intra prediction mode of the intra prediction modes of the plurality of the luma blocks, intra prediction modes of neighboring chroma blocks of the current chroma block, and at least one of default prediction modes,
        derive the intra chroma prediction mode of the current chroma block based on the chroma prediction mode candidates and the index information regarding the intra chroma prediction mode, and
        generate a predicted block for the current chroma block based on the derived intra chroma prediction mode of the current chroma block,
    wherein the default prediction modes include at least one of a DC mode or a planar mode, wherein, based on a value of the index information being 0, the combined direct mode is selected from among the chroma prediction mode candidates, wherein a maximum number of the chroma prediction mode candidates is 5, and the value of the index information is one among 0 through 4, wherein the value of the index information is derived based on binarization bits for the index information, wherein for the value of the index information being 0, the binarization bits is represented by 0, wherein for the value of the index information being 1, the binarization bits is represented by 100, wherein for the value of the index information being 2, the binarization bits is represented by 101, wherein for the value of the index information being 3, the binarization bits is represented by 110, wherein for the value of the index information being 4, the binarization bits is represented by 111, and wherein generating the predicted block for the current block comprises:

generating a first predicted block for the current chroma block based on the first intra prediction mode of the intra prediction modes of the plurality of the luma blocks, the first predicted block including first predicted pixels for the current chroma block, generating a second predicted block for the current chroma block based on the second intra prediction mode of the intra prediction modes of the plurality of the luma blocks, the second predicted block including second predicted pixels for the current chroma block, and generating the predicted block for the current chroma block based on a weighted sum using the first predicted block and the second predicted block, wherein a predicted pixel of the predicted block for the current chroma block is generated based on the weighted sum using a first predicted pixel of the chroma block and a second predicted pixel of the chroma block; and an adder configured to generate a reconstructed block based on the predicted block for the current chroma block.

5. An encoding apparatus which performs picture encoding, the encoding apparatus comprising:

a predictor configured to:

detect intra prediction modes of a plurality of luma blocks in a luma region corresponding to a current chroma block, derive chroma prediction mode candidates for the current chroma block, wherein the chroma prediction mode candidates include a combined direct mode, a first intra prediction mode of the intra prediction modes of the plurality of the luma blocks, a second intra prediction mode of the intra prediction modes of the plurality of the luma blocks, intra prediction modes of neighboring chroma blocks of the current chroma block, and at least one of default prediction modes, select an intra chroma prediction mode of the current chroma block based on the chroma prediction mode candidates, generate index information regarding the intra chroma prediction mode, and generate a predicted block for the current chroma block based on the selected intra chroma prediction mode of the current chroma block;

a residual processor configured to generate residual information based on the predicted block; and an entropy encoder configured to encode image information including the index information regarding the intra chroma prediction mode and the residual information, wherein the default prediction modes include at least one of a DC mode or a planar mode, wherein a value of the index information being 0 indicates the combined direct mode from among the chroma prediction mode candidates, wherein a maximum number of the chroma prediction mode candidates is 5, and the value of the index information is one among 0 through 4, wherein the value of the index information is derived based on binarization bits for the index information, wherein for the value of the index information being 0, the binarization bits is represented by 0, wherein for the value of the index information being 1, the binarization bits is represented by 100, wherein for the value of the index information being 2, the binarization bits is represented by 101, wherein for the value of the index information being 3, the binarization bits is represented by 110, wherein for the value of the index information being 4, the binarization bits is represented by 111, and wherein, based on the combined direct mode being applied to the current chroma block, the predictor generates the predicted block by performing operations comprising:

generating a first predicted block for the current chroma block based on the first intra prediction mode of the intra prediction modes of the plurality of the luma blocks, wherein the first predicted block includes first predicted pixels for the current chroma block, generating a second predicted block for the current chroma block based on the second intra prediction mode of the intra prediction modes of the plurality of the luma blocks, wherein the second predicted block includes second predicted pixels for the current chroma block, and generating the predicted block for the current chroma block based on a weighted sum using the first predicted block and the second predicted block, wherein a predicted pixel of the predicted block for the current chroma block is generated based on the weighted sum using a first predicted pixel of the chroma block and a second predicted pixel of the chroma block.

* * * * *